United States Patent [19]
Mitchnick et al.

[11] Patent Number: 6,045,650
[45] Date of Patent: Apr. 4, 2000

[54] HYDROPHILIC MATERIALS AND THEIR METHOD OF PREPARATION

[75] Inventors: Mark A. Mitchnick, East Hampton, N.Y.; Garry Gwozdz, Nazareth, Pa.; William A. Hendrickson, Stillwater, Minn.

[73] Assignee: Sunsmart, Inc., Wainscott, N.Y.

[21] Appl. No.: 08/931,623

[22] Filed: Sep. 16, 1997

[51] Int. Cl.[7] ................................................... B05B 31/00
[52] U.S. Cl. .......................... 156/279; 156/276; 427/387; 427/180; 427/190; 427/419.2; 427/397.7; 525/523; 525/453; 525/480; 428/404
[58] Field of Search .................................... 162/280, 272, 162/363, 281, 199, 111; 428/403, 404; 156/276, 279; 427/387, 388.2, 393.6, 180, 190, 397.7, 397.8, 379, 58, 215, 419.2; 525/523, 431, 453, 480

[56] References Cited

U.S. PATENT DOCUMENTS

| | | | |
|---|---|---|---|
| 4,277,525 | 7/1981 | Nakayama et al. | 427/387 |
| 5,145,719 | 9/1992 | Towata et al. | 427/215 |
| 5,344,751 | 9/1994 | Carlson | 430/527 |
| 5,348,805 | 9/1994 | Zagdoun et al. | 428/432 |
| 5,486,631 | 1/1996 | Mitchnick et al. | 556/10 |
| 5,496,402 | 3/1996 | Sakamoto et al. | 106/287.16 |
| 5,520,952 | 5/1996 | Tanitsu et al. | 427/58 |
| 5,536,492 | 7/1996 | Mitchnick et al. | 424/59 |

FOREIGN PATENT DOCUMENTS

| | | |
|---|---|---|
| 0307054 | 3/1989 | European Pat. Off. . |
| 19736925 | 3/1998 | Germany . |
| 62-177071 | 8/1987 | Japan . |
| 09316361 | 12/1997 | Japan . |
| 654054 | 6/1951 | United Kingdom . |

*Primary Examiner*—Merrick Dixon
*Attorney, Agent, or Firm*—Schwegman, Lundberg, Woessner and Kluth

[57] ABSTRACT

A process is described for applying a solid coating onto a surface of an article. The surface of an article has a first physical property measurable as a degree of hydrophobicity and/or hydrophilicity. A liquid coating of an oxidizable material containing at least one element other than carbon, hydrogen, oxygen and nitrogen is applied onto the surface of the article. The oxidizable material is oxidized on the surface to attach an oxidized material having said at least one element other than carbon, oxygen, nitrogen and hydrogen onto said surface. This process thereby changes the first physical property with respect to its hydrophobicity and/or hydrophilicity. The process is relatively gentle to the underlying surface, at least in part because of the moderate temperatures which may be used for oxidation, and a wide range of properties may be provided onto the surface by appropriate selection and/or mixing of the liquid material and selection of the surface. The process is particularly useful with particulate materials.

31 Claims, No Drawings

HYDROPHILIC MATERIALS AND THEIR METHOD OF PREPARATION

BACKGROUND OF THE INVENTION

1. Field of the Invention

The present invention relates to the formation of oxide coatings on the surfaces of materials, particularly the formation of coatings with controlled hydrophilic/hydrophobic surface characteristics, especially by forming hydrophilic oxide coatings of inorganic, semimetallic, and/or metallic oxides, and most particularly the formation of these controlled, e.g., hydrophilic oxide coatings on particles to adjust the surface and/or chemical properties of the particles. The particles may include such materials as fillers, pigments, lakes, catalysts, matting agents, optical diffusive agents, strengtheners, magnetic particles, catalysts, reflective materials, film or sheet surfaces, fibers, filaments, and many other forms of materials and especially particulate additives.

2. Background of the Art

Particles are conventionally and conveniently added to many different types of compositions and products where the particles are intended to remain in particulate form after the manufacturing or finishing of the product. Product uses of particulates cover such diverse technical utilities as fillers, colorants (e.g., pigments and lakes), matting agents, antislip agents, optical diffusing agents, strengthening agents, viscosity modifiers, reflective particles, magnetic particles, carriers for other compounds and materials, and other types of composition additives. There are a number of problems which have long been associated with the use of particles in other formulations. The composition of the particle may react with ingredients in the formulation and detract from a desired activity of a component, reaction of an ingredient of the formulation with the particle may adversely affect the properties (physical or chemical) of the particle, the particle may be incompatible with the formulation and not form stable dispersions or suspensions, or the particles may agglomerate within the formulation and not remain in the appropriate size for their utility. These problems have been addressed over the years by many different techniques and chemical efforts.

Amongst the control techniques which have been used to overcome these problems are the application of coatings to the surface of the particles, using coupling agents on the surface of the particles, physically modifying the surface of the particles, chemically modifying the innate composition on the surface of the particles, and/or modifying the formulation to accommodate the particle. The last is one of the least desirable methods of controlling the behavior of the particles in the formulation as it requires alteration of the fundamental composition or at least tinkering of the composition which can alter its essential properties. Similarly coatings on the surface of the particles or reaction of materials (such as coupling agents) onto the surface may affect more than the mere hydrophilic/hydrophobic balance of the properties of the surface and may even add undesirable functionality into the particle surface which can directly affect the performance of the composition. Physical modification of the surface of the particle can easily affect its optical properties, and coatings on the particles can be difficult and expensive to achieve, with results that can vary greatly from one type of particle to another.

Zinc oxide is a particular pigment which has received significant attention with respect to its commercial use with coatings thereon. As described in U.S. Pat. No. 5,486,631, zinc oxide has been coated with organic oils, such as the organic oil tri-(octyldodecyl)citrate, to provide a stable dispersion of the zinc oxide which can be used in sun screens. The organic oil coating is not permanent and therefor not durable because the oil neither reacts with itself to form a coating nor reacts with the zinc oxide itself. The oil also disrupts the uniformity of the zinc oxide particles themselves as they are distributed on the skin in the sun screen formulations. This U.S. Pat. No. (5,486,631) describes the use of a specific type of reactive silicone to hydrophobize the surface of zinc oxide particles. Silicone compounds are shown of the formula:

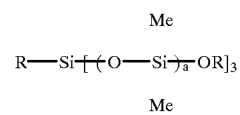

wherein Me is methyl,
R is an alkyl group having one to ten carbon atoms,
R is methyl or ethyl, and
a is an integer within the range of to 12.

It is at least noteworthy that these types of compounds used in the prior art, as represented by this reference (U.S. Pat. No. 5,486,631), hydrophobize surfaces while the practice of the present invention is able to increase the hydrophilicity of the surfaces and even render them hydrophilic using the different process of the present invention.

The specific silicone compounds are mixed with the zinc oxide particles then the mixture is heated at a temperature of between 40 and 100° C. for two to ten hours. The silicone compound is indicated as forming direct bonds between the silicon atom and zinc oxide crystals, of course, with additional valences in the silicon atom satisfied by original groups from the specific silicone compounds.

U.S. Pat. No. 5,536,492 describes the use of hydrophobized zinc oxide particles such as those made in U.S. Pat. No. 5,486,631 in sun screen products applied to the skin.

U.S. Pat. Nos. 5,458,681 and 5,368,639 describe organosilicon-treated pigments, a process for making such treated pigments, and cosmetic compositions made with those treated pigments. Linear reactive alkylpolysiloxane having particular substituent groups (for example, including amino, imino, halogen, hydroxyl and/or alkoxy groups) are oriented and adsorbed to the surface of a pigment or extender by heat treatment. The alkylpolysiloxane is identified as having a particular range of polymerization from 25 to 100 and a Mw/Mn ratio of 1.0 to 1.3. The silicone is described as firmly adhered to the surface of the pigment.

Coatings of organo-metallic compounds, organic non-metallic compounds, inorganic oxides, and inorganic non-oxide materials have been widely used in the formation of abrasion resistant and/or solvent resistant coatings on surfaces, including the surfaces of polymers. The range of materials which have been use for this purpose covers a wide spectrum of materials including, but not limited to, acrylates, polysiloxanes, poly(ambifunctional)silanes, esters of metals (e.g., esters of titanium, aluminum, zirconium, etc.) alone or in combination with other ingredients such as ambifunctional silanes (e.g., U.S. Pat. No. 4,084,021).

Silane and titanate compounds are also well known in the general literature as coupling agents or coupling moieties for chemically bonding materials to each other, including the bonding of specific functional moieties to particular surfaces. In this vein, Okano, Tamon; Tsukiyama, Katsunori; Konishi, Hisatoshi; and Kiji, Jitsuo, "Versatile Polymer-Bound Rhodium Catalysts. Facile Hydrogenation of Aromatic Compounds in the Liquid Phase", Chemistry Letters, 1982, pp. 603–606 show the attachment of phosphino groups to silica (glass) surfaces by reacting an alpha-phosphino-propyltrimethoxyalkane to the glass to form a tethered moiety having an alpha-phosphinopropyl group tethered to the glass through a trisiloxy bond.

Amphoteric/ambifunctional compounds of silanes and titanates, as well as other classes of bifunctional compounds, are also used as coupling agents, with the various end groups selected for appropriate reactions to assist in bonding or stabilizing two dissimilar surfaces or materials. Of particular interest to the practice of this invention is U.S. Pat. No. 4,756,906 which describes an adjustable cosmetic composition, and in its background disclosure describes the use of adsorption (including chemisorption) by Van der Waals forces, dipole-dipole attraction, or hydrogen bonding to associate additives to the cosmetic composition and coupling agents. Titanate and silane coupling agents are extensively disclosed. The list and formulae of materials within these classes on columns 5 and 6, as well as the classes of pigments described on columns 6 and 7 is hereby incorporated by reference for that disclosure.

U.S. Pat. No. 5,520,952 describes a method for producing protective film coatings, particularly on electronic parts and devices. The method comprises the application of a liquid coating composition onto a surface, the principal component of the coating composition comprising a partial cohydrolysis-condensation product of a tetraalkoxy silane and a functional alkoxy silane(e.g., tetraethoxy silane and 3-methacryloxypropyl trimethoxy silane, respectively). The coated article is heated to effect curing of the composition. Finely divided inorganic filler (e.g., a colloidal silica) may be added to the liquid coating composition to even further increase the hardness of the cured coating. U.S. Pat. No. 5,496,402, which is commonly assigned with U.S. Pat. No. 5,520,952 similarly shows stable coating compositions comprising two different hydrolyzable silanes, one a triester and the other a tetraester silane. A third commonly assigned patent, U.S. Pat. No. 4,865,649 also describes a coating solution for forming a silica-based coating film, the coating solution comprising an organic solution of a hydrolyzate of an alkoxy silane mixture of at least two different kinds of d-, tri, and tetra-alkoxy silane compounds in a specified molar ratio. The coating compositions are cured in the presence of water without the need for an acid catalyst to effect cohydrolysis of the silanes. Another related patent, U.S. Pat. No. 4,277,525, describes liquid coating compositions for the formation of silica coating films, the coating composition comprising an alkoxy-containing silane, a lower carboxylic acid and an alcohol in the presence of a reaction accelerator (which is an acid different from the carboxylic acid).

U.S. Pat. No. 5,344,751 describes an antistatic protective coating comprising a mixture of sodium metasilicate, a silica sol, and a silane coupling agent. Similar compositions comprising orthosilicates are known in the patent literature also.

UV curable coatings comprising a photoinitiator, hydrolysis product of silylacrylate and aqueous colloidal silica is shown (also in combination with a polyfunctional acrylate) to provide adherent and abrasion resistant coatings, particularly for polycarbonate resins in U.S. Pat. No. 4,455,205.

Abrasion resistant coatings and coatings of metal oxides have also been deposited on surfaces by vapor deposition techniques in which metal and oxygen (and/or other reactive materials such as sulfur) are evaporated and reacted/deposited onto surfaces to form coatings. Apparatus and processes for this type of coating are shown, for example, in U.S. Pat. Nos. 4,430,366 and 4,405,678. These coatings may even have gradations in their relative atomic distribution of materials within the vapor-deposited layers.

It is known in the art that pigments may be desirably provided with coatings to protect them from formulations into which they are compounded, as previously noted. U.S. Pat. No. 5,482,547 describes the application of a tenacious coating of an alkyl silicate onto pigments, the coating being fixed onto the surface of the pigment by adsorption of an alkyl silicate on a layer that coats the surface of the pigment particles and consists essentially of partially hydrolyzed organic compounds of a specific formula comprising group 4A or 4B elements and chelates of a specific formula, the chelates being titanium or tin chelates. The alkyl silicate may be hydrolyzed before, during or after adsorption. Good gloss and rheologic properties are asserted to be a result of this particular coating.

Each of these processes and other commercial processes have their respective advantages and disadvantages. One surprising aspect of this field of technology is that even when similar starting reagents are used for the different processes, different products and/or different properties may be produced in the final article because of variations in conditions. Alternative coatings, coating solutions and coating processes which may provide a wider and different range of properties are still desirable.

SUMMARY OF THE INVENTION

The present invention relates to the application of a coating with designed hydrophilic/hydrophobic properties to the surface of articles by oxidative means. The surfaces are particularly advantageous as the surface of particles, and the coating is particularly desirable when it contains inorganic oxymetallo bond of units MyOx (where M is a metal or metalloid, y is the number of M atoms, and x is the number of oxygen atoms in the bond or linkage units), such bonds including, for example, units such as $SiO_x$, $ZnO_x$, $TiO_x$, $AlO_x$, $SnO_x$, $MnO_x$, $MgO_x$, and the like (and other materials listed later herein). The coatings are applied by the formation of a liquid coating comprising an oxidizable inorganic/metallo compound on the particles or surface and the subsequent oxidation of the metallo compound to form the coating on the surface. The coating may be continuous or discontinuous, usually dependent upon the area of coverage of the liquid on the particle prior to oxidation).

DETAILED DESCRIPTION OF THE INVENTION

Surfaces are described which have coatings thereon which alter, control and/or adjust the hydrophobic/hydrophilic properties of the surface of the underlying material. As surfaces of specific compositions or materials have their own specific characteristic properties including surface charge and those properties with respect to their affinity for different types of materials (e.g., hydrophobicity, hydrophilicity, oleophobicity and oleophilicity, as well as polar and non-polar attractiveness), it is often desirable to be able to provide treatments and coatings which can affect and/or alter those innate properties. These treatments can allow for broader use or improved use of the materials in differing environments.

The basic process of the present invention comprises applying a liquid coating onto a surface hydrophilicity (e.g., a flat, shaped, irregular or particulate surface) having a relative property (e.g., of hydrophobicity), the liquid coating comprising, consisting essentially of, or consisting of a first compound having an inorganic oxidizable group or moiety, and then oxidizing said first compound to form a second compound which is bound to said surface, said second compound changing said relative property. In most cases this relative property will change to greater hydrophilicity, depending upon the essential nature of the first compound used. Preferred compounds comprise inorganic or more preferably metallic, metalloid or semimetallic ester containing compounds such as oxides MxOy (as described above) and most preferably as silicon compounds such as silanes (e.g., $R_m Si[OR^1]_n$), that is compounds wherein R is an organic group (preferably bonded to the Si atom through a carbon atom), halogen or hydrogen, $R^1$ is H, or an organic group, such as alkyl, aryl or heterocycle, preferably alkyl of 1 to 4 carbon atoms, wherein R is 0, 1, 2 or 3 and n is 1, 2, 3 or 4; titanate counterparts of the silanes, such as $R_m Ti[O R^1]_n$ in which R, $R^1$, m and n are as defined above; and any other oxidizable metallo or semimetallo compounds of the general formula $R_m M[R^1]_n$ wherein M is a metal or semimetal such as those selected from the group consisting of Si, Ti, Zn, Al, Sn, Fe, Cu, Zr, B, Mg, Mn, W, Sb, Au, Ag, Cr, and the like, R and $R^1$ are as defined above, m plus n equals the valence state of M, and n must be at least 1. In addition to the preferred silanes, mainly preferred because of their ease of use and ready commercial availability, silicon compounds such as silazanes, siloxane cyclics, siloxane dimers, siloxane trimers, silane fluids, and tris-)alkoxysiloxy)-3-metacryloxyalkylsilanes (less preferred) may be used in the practice of the present invention.

In addition to these specific classes of compounds and metals/metalloids, and in addition to monometallic, monometalloid compounds as the starting materials, dimetallic (having two different metal/metalloid atoms, bimetallic (having two of the same metal/metalloid atoms in the compound), heterometallic (having one metal and one metalloid atom in the same compound), dimetalloid and bi-metalloid compounds, and mixtures of any of these groups of compounds are useful in the practice of the present invention. Mixtures and blends of the compounds provide unique capabilities for uniformly distributing different properties over a surface, or balancing (averaging) properties over the surface. An extremely wide range of these classes of oxidizable metal or metalloid compounds are commercially available, as exemplified by the lists of compounds in the 1996 Gelest, Inc. chemical catalog (e.g., pages 287 for a generic description of heterometallic and heterometalloid alkoxides, including alkali metal combinations; and especially pages 21–217; 220–221; 231–233; and 258–265) and the 1994 PCR, Incorporated General Catalog of "Chemicals for Research Scientists, especially pages 192–193 and 198–199). Germanium compounds have a functional similarity to silicon compounds in the practice of the present invention. A wide range of these compounds, as shown in the 1996 Gelest, Inc. catalog identified above, as shown particularly on pages 216–217.

Similarly, as indicated above, oxidizable tin compounds are another class of compounds useful equivalently to the silicon compounds preferred in the practice of the present invention. There are many commercially available alternatives within this class, as shown for example on pages 258–264 of the 1996 Gelest, Inc. chemical catalog. Examples of R (as shown in the silicon compound formula above, and equally applicable in corresponding groups attached to other metal or metalloid atoms in the oxidizable compounds of the present invention) are apparent to those of ordinary skill in the art and they may be functional (e.g., specifically reactive) groups or relatively non-reactive groups which may provide useful physical properties when the material is deposited on the surface prior to oxidation, or less likely, leave a residue which is advantageous after oxidation. Such R groups would include aliphatic and aromatic groups such as alkyl groups, alkyl ester groups, poly(oxyalkylene) groups, phenyl groups, naphthyl groups, H, hetero groups (e.g., thioethers), functionally terminated groups such as amino-alkyl, epoxy-alkyl, carboxyalkyl, even possibly halogen atoms such as I, Br, Cl and F (but these are much less preferred because of the halogen products, including halogenic acids) and the like. $R^1$ may be any oxidizable group such as an ester group, including those with their own functionality on the distal (from the position of attachment) end of the group. Such groups $R^1$ after attachment form ester or ester type groups so that $R^1$ is actually an aliphatic or aromatic group such as R, but is preferably limited to aliphatic groups of 1 to 20 carbon atoms, more preferably 1 to 10 carbon atoms, and most preferably 1 to 4 carbon atoms for aliphatic groups and 1 to 10 carbon atoms for aromatic groups. For silicon based compounds, representative examples are the silicone compounds described in U.S. Pat. No. 5,486,631, the reactive silanes of U.S. Pat. No. 4,084,021 and many other commercially available silicon compounds which may be oxidized, particularly at temperatures between 250 to 600° C., and more particularly at temperatures between 350 and 500° C. It is also possible to use low temperature oxidizing environments, such as with oxidizing additives present or oxidizing vapor conditions, or with aerobically carried catalysts or accelerants to enable lower temperature oxidation onto surfaces which ordinarily could not withstand the temperatures used to oxidize the silicon containing materials (or toher classes of materials). The oxidation product of this reaction may actually create a direct chemical bond to the composition of the substrate, or may merely create strong physical attachments, but the former appears to be the more likely result based on washing of the surfaces after the oxidation process.

The other classes of compounds include the counterparts of these compounds (i.e., with the silicon replaced by the other elements) such as titanate esters, zirconium esters, and other metal or non-metal esters. Mixtures of the various oxidizable compounds may be used, as suggested above, with particularly beneficial results, providing variations or mixtures of properties on surfaces, discontinuous areas of specific properties, blends (averages of properties), and the like.

A non-exhaustive list of compounds useful within the practice of the present invention includes such materials as:

Isobutyltrimethyoxysilane, Aminopropyltriethoxysilane, Aminopropyltriethoxysilane, 3-Methacryloxypropyl-trimethoxysilane, n-(2-Aminoethyl)-3-amino-propyltrimethoxysilane, 3-Glycidoxypropyltrimethoxysilance, n-Octyltriethoxysilane, Hexamethyldisilazane, Diethylsilane, Vinyldimethylchlorosilane, Vinylmethyldichlorosilane, Vinylmethyldimethoxysilane, Tetrakis[1-methoxy-2-propoxy]silane, Triethylchlorosilane, Vinylmethyldiethoxysilane, Vinyltrichlorosilane, Vinyltrimethoxysilane, Vinyltriethoxysilane, Dimethyldiethoxysilane, Hexamethyldisilazane, Divinyltetramethyldisilazane, Tetramethyldisilazane, Heptamethyldisilazane, Tris[(trifluoropropyl)methyl] cyclotrisiloxane, Methylvinylcyclotetrasiloxane, 1,3,5,7-Tetramethylcyclotetrasiloxane, 1,3,5,7,9-Pentamethylcyclopentasiloxane, Hexamethyldisiloxane, Divinyltetramethyldisiloxane, Divinyltetramethyldisiloxane (high Purity), Tetramethyldisiloxane, 1,3-Bis(3- aminopropyl)tetramethyldisiloxane, Heptamethyltrisiloxane, Chlorinated phenyl methyl polysiloxane, 1,3Bis(aminopropyl)tetramethyldisiloxane, Bis(3-aminopropyl)polydimethylsiloxane, Bis(3-aminopropyl)polydimethylsiloxane, Diethoxy polydimethylsiloxane, Tris(trimethylsiloxy)3-mehtacryloxypropylsilane, Tetraisopropoxygermane, Tetrakis(Trimethylsiloxy-Germane, Tetramethoxygermane, Tetramethylgermane, Tetrapentylgermane, Tetraphenylgermane, Tetra-n-Propylgermane, Tetra-p-Tolylgermane, Triallylfluorogermane, Tri-n-Butylacetoxygermane, Tetraphenyltin, Tetravinyltin, Tetraphenltin Tetravinyltin, Tin II Acetate, Tin IV Acetate, Tin Acetylacetonate, Tin t-Butoxide, Tin II Chloride, anhydrous Tin II Chloride, Dihydrate Tin IV Chloride, anhydrous Tin II Ethoxide, Tin II Flouride, Tetramethyltin, Tetra-n-Octyltin, Tetra-n-Pentyltin, Tetraethyltin, Tetraisopropoxytin-Isopropanol Adduct, Tetraisopropyltin, Tetrakis(Diethylamino)Tin, Tetrakis(Dimethylamino)Tin, Potasium Stannate trihydrate, Sodium Stannate trihydrate, Sodium Tin Ethoxide, Stannic Chloride, Tetraacetoxytin, Tetraallyltin, Tetra-t-Butoxytin, Tetra-n-Butyltin, Methacryloxytri-n-Butyltin, Methyltrichilorotin, Phenylethynyltri-n-Butyltin, Phenyltri-n-Butyltin, Phenyltrichlorotin, Divinyldi-n-Butyltin, 1-Ethoxyvinyltri-n-Butyltin, Ethynyltri-n-Butyltin, Hexabutyldistannoxane, Hex-n-Butylditin, Hexamethylditin, Dimethylhydroxy (Oleate)Tin, Dimethyltin Oxide, Dioctyldichlorotin, Dioctyldilauryltin, Dioctyldineodecanoatetin, Dioctyl (Maleate)Tin, Dioctyltin Oxide, Diphenyldichlorotin, Allytrichlorogermane, Allyltriethylgermane, Allytrimethylgermane, 3-Aminopropyltributylgermane, Ammonium Hexafluorogermanate, Ammonium Tris (Oxalato)Germanate, Benzyltricholorogermane, Bis[Bis (Trimethylsilyl)Amino]-Germanium II, Bis(Chloromethyl) Dimethylgermane, Bismuth Germanate, Bromomethyltribormogermane, Bromotrimethylgermane, Tetra-n-Butylgermane, Tetraethoxygermane, and Tetraethylgermane.

Preferred silicon compounds of the present invention may be represented by the formula:

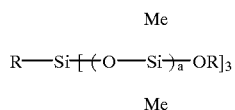

wherein Me is a methyl group,
R is an organic group, preferably an alkyl group having one to ten carbon atoms,
R is an alkyl or aryl group, preferably a methyl or ethyl group, and
a is an integer within the range of to 12.

Counterparts of these materials where Me is replaced with other organic groups, particularly alkyl groups are useful in the practice of the present invention, as are the other nominative elemental counterparts (e.g., the titania, germainum, etc. counterparts of silicon).

As used in the practice of the present invention, it is well understood that the art tolerates or even advises on substitution of groups within these chemical formulae. To that end, wherever the term "group" is used in described a chemical material or functionality, conventional substitution is specifically included within the description of that term. For example, where alkyl group is recited, not only are alkyl moieties such as methyl, ethyl isobutyl, t-butyl, iso-octyl, and dodecyl included, but also alkyls with such conventional substitution as is recognized within the relevant art, such as hydroxymethyl, 1-, or 2-halo-ethyl, omega-cyano-butyl, propyl-sulfonate, etc. with such substituent groups as amino, carboxyl, acyl, etc. tolerated according to the general practices of the art. Where the term "moiety" is used, as in alkyl moiety, that term reflects only the strict definition of alkyl (or other moiety modified group) without allowance for substitution.

The substrates onto which the compositions of the invention may be deposited and oxidized into coatings are essentially limited only by the ability of the substrate to be resistant to the temperatures used in the oxidation process. Metal, metal oxide, inorganic oxides generally, glasses, ceramics, composites, pigments (organic or inorganic), lakes, catalysts, reflective particles, magnetic particles, radiation absorbing particles, flat surfaces, shaped surfaces, structural elements and the like may all take advantage of the compositions and process of the present invention. Because the composition of the invention may be readily controlled as to the thickness or continuity of the final coating, a wide range of other uses and properties may be provided. For example, by controlling the amount of liquid coating on the surface, the continuity of the liquid coating, the thickness of the liquid coating, and the like, similar attributes in the final oxidized materials may also be controlled. If the coated substrate were catalytic in nature, the degree of porosity allowed in the coating could control the degree of exposure of the catalyst. If the underlying substrate were highly hydrophobic, the specific degree of hydrophilicity/hydrophobicity of the product could be controlled by designing the specific percentage of the surface to be the exposed underlying material or the coating produced by the oxidation process.

It is often understood in the compounding arts, that is those fields of technology where materials are formulated into related but different end products, that a significant amount of time has to be spent in reformulating compositions because of changes in non-functional ingredients. For example, in the cosmetic industry, the replacement of one pigment in a cosmetic composition by a different pigment may alter the physical properties of the final product and even render the formulation unsuitable because of those alterations in properties. These alterations are often due to the different chemical and/or physical properties (usually other than mere size differences) between pigments. Specifically the difference in hydrophobicity/hydrophilicity amongst different pigments may prevent the direct exchange of pigments in compositions which are otherwise expected to be substantially identical. For example, when a new lipstick base or eye shade base is created, each color must be individually formulated, not because of color effects, but because of chemical/physical interaction effects between the different colorants (such as the pigments) and the base. This adds significant cost to the introduction of new cosmetic compositions, without providing any specific merit within the minor variations in compositions which must often be effected to allow for different pigments to be used.

The present invention allows for a store or stock of pigments to be created, with different colors or coloration effects (e.g., fluorescence, luminescence, pearlescence, etc.), yet which appear to be identical to the composition and the formulator with respect to the physical properties of the pigment (except for possibly size). This would enable the formulator to create a stock of pigments (with essentially indistinguishable physical properties), and create formulations and compositions from a single base or standard composition without having to reformulate for each color change. This would be performed according to the practice of the present invention by taking different pigments having different colors or coloration effects, applying an oxidizable liquid coating according to the practice of the present composition, oxidizing the liquid coating composition to form a coating on each separate batch of pigment which has a specific range of physical properties (especially with respect to hydrophobicity/hydrophilicity), and maintaining a stock of these different pigments. A base or standard compounding formulation is created, and different color formulations are created by adding the specifically desired pigments, with their essentially identical surface hydrophobicity/hydrophilicity properties, into the standard compounding formulation. As the different color pigments physically and chemically appear to be identical to the formulation, there is essentially no necessary variation in the formulation needed except for assessment of the concentration of pigment needed for the desired color density or saturation for that particular color.

It is also an alternative in the practice of the present invention to assure that an oxidizing environment is present during the oxidation step. This can be done by the appropriate selection of the oxidizable compounds, the performance of the step in air, an oxidizing agent available environment, or an oxygen rich environment, the provision of oxygen releasing or providing compounds (such as peroxides, including hydrogen peroxide, and other techniques within the skill of the practicing chemist.

The liquid may be applied to the surface by any convenient method, including, but not limited to conventional liquid coating/application processes such as dipping, spraying, spreading, printing, gravure coating screen coating, blending (particles with a liquid), cyclone application onto particles, and any other available process.

The oxidation process may even be used to control agglomeration of particles, rather than allowing particles to seek their own agglomerated state. In some compositions, controlled agglomeration, as opposed to total absence of agglomeration, can be desirable.

It is also possible, according to the practices of the present invention to provide patterns or image distributions of the resultant inorganic oxides (e.g., the silica) onto a surface by originally breating a predetermined pattern of oxidizable compound on the surface of the material and then oxidizing the oxidizable material to form a predetermined distribution of residue on the surface. Although one desirable aspect of the present invention is to be able to provide colorless coatings on surfaces, so that underlying colors are not disturbed, the oxidation products may be selected to provide colors. In this way specific colors can be added as complete coatings (continuous coatings) or as patterns, e.g., discontinuous coatings.

Several different types of particles were coated with a silane of the formula

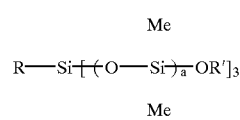

wherein R is alkyl of 1–10 carbon atoms, R' is methyl or ethyl, and a is an integer of from 4 to 12. These silane coated particles were then heated to 500 degrees C for one hour in ambient (open atmospheric) conditions.

Zeta potential measurements were done to document surface characteristic changes. As controls we also heated the uncoated particles and did Zeta potential measurements on them as well. The two particles we tested were iron oxide and mica.

Black Iron Oxide, No Surface Treatment Prior To Experiment
Heated at 500 C, no surface treatment

| PH | ZP (mv) |
| --- | --- |
| 3.70 | 29.5 |
| 4.40 | 30.23 |
| 5.02 | 28.21 |
| 8.05 | 4.97 |
| 9.13 | −16.00 |
| 10.5 | −21.10 |

Heated at 500 C after application of 10% silicone

| PH | ZP (mv) |
| --- | --- |
| 3.20 | 10.56 |
| 3.84 | 0.02 |
| 4.12 | −5.47 |
| 4.6 | −6.57 |
| 5.14 | −9.26 |
| 5.18 | −17.40 |
| 10.67 | −29.40 |

Note that the Zeta potential (the measurement of surface charge) went negative between 8.05 and 9.13 on the untreated particle and at much lower pHs (around 4) on the treated particle. Pure silica has a negative Zeta potential at all these pHs. This shows rather nicely that, using our process we have deposited enough silica on the surface to change the Zeta potential. In practice, this has many applications. For instance these positively charged particles of untreated iron oxide are difficult to use in anionic systems (the vast majority of emulsifiers used are anionic). With this surface treatment we have made the particles anionic (at pHs that would be used in cosmetics) and thus rendered them much more useful.

Mica, No Surface Treatment Prior To Coating
Mica, heated 500 C, no treatment

| PH | ZP (mv) |
| --- | --- |
| 3.5 | −6.39 |
| 4.8 | −22.6 |
| 6.8 | −27.61 |
| 10.00 | −36.55 |

Mica, 10% silicone treated, heated 500 C

| PH | ZP (mv) |
| --- | --- |
| 3.5 | −20.40 |
| 5.70 | −33.47 |
| 8.9 | −35.80 |
| 10.10 | −38.21 |

We claim:
1. A process for applying a solid coating onto a surface of an article, said surface of an article having a first physical property measurable as a degree of hydrophobicity and/or hydrophilicity, applying a liquid coating of an oxidizable material containing at least one element other than carbon, hydrogen, oxygen and nitrogen onto the surface of said article, oxidizing said oxidizable material so as to attach a material having said at least one element other than carbon, oxygen, nitrogen and hydrogen onto said surface, and thereby changing said first physical property with respect to its hydrophobicity and/or hydrophilicity.

2. The process of claim 1 wherein said surface has a color and said oxidizing and attaching a material onto said surface does not change the color of said surface by either reflection or transmission observation by more than 0.3 optical density units at any wavelength between 410 and 700 nm.

3. The process of claim 1 wherein said surface has a color and said oxidizing and attaching a material onto said surface does not change the color of said surface by either reflection or transmission observation by more than 0.1 optical density units at any wavelength between 410 and 700 nm.

4. The process of claim 1 wherein said oxidizable material comprises a silane or a metal ester represented by the formula:

$R_mM[OR^1]_n$ wherein M is an element selected from the group consisting of Si, Ti, Zn, Al, Sn, Fe, Cu, Zr, B, Mg, Mn, W, Sb, Ge, Au, Ag, and Cr, wherein $R^1$ is an organic group, halogen or hydrogen, $R^1$ is H, or an organic group, m plus n equals the valence state of M, and n is at least 1.

5. The process of claim 4 wherein R is an aliphatic organic group.

6. The process of claim 1 wherein $R^1$ is an aliphatic or aromatic group.

7. The process of claim 5 wherein $R^1$ is an aliphatic or aromatic group.

8. The process of claim 4 wherein $R^1$ is an alkyl group.

9. The process of claim 5 wherein $R^1$ is an alkyl group of 1 to 10 carbon atoms.

10. The process of claim 1 wherein said article comprises at least one particulate material.

11. The process of claim 10 wherein said particulate material comprises pigment which has numerical average particle sizes which are within ±0.20% of each other.

12. The process of claim 11 wherein said coating is formed by oxidizing and chemically bonding a material onto said surface does not change the color of said surface by either reflection or transmission observation by more than 0.3 optical density units at any wavelength between 410 and 700 nm.

13. The process of claim 11 wherein said coating is applied by process for applying a solid coating onto a surface of particulate matter comprising pigment, each said surface of the particulate matter comprising pigment has a first physical property measurable as a degree of hydrophobicity and/or hydrophilicity, applying a liquid coating of an oxidizable material containing at least one element other than carbon, hydrogen, oxygen and nitrogen onto the surface of said particulate matter comprising pigment, oxidizing said oxidizable material so as to attach a material having said at least one element other than carbon, oxygen, nitrogen and hydrogen onto said surface of the particulate matter comprising pigment, and thereby changing said first physical property with respect to its hydrophobicity and/or hydrophilicity.

14. The process of claim 13 wherein said surface of the particulate matter comprising pigment has a color and said oxidizing and attaching a material onto said surface of a pigment does not change the color of said surface of the particulate matter comprising pigment by either reflection or transmission observation by more than 0.3 optical density units at any wavelength between 410 and 700 nm.

15. The process of claim 1 wherein said oxidizable material comprises a material of the formula:

$R_mM[OR^1]_n$ wherein R is an organic group bonded to M through a carbon atom,

R1 is H or an organic group,

M is selected from the group consisting of Ti, Zn, Al, Sn, Fe, Cu, Zr, B, Mg, Mn, W, Sb, Au, Ag, and Cr, n is at least 1, and m+n equals the valence state of M.

16. The process of claim 1 wherein said oxidizable material comprises a material of the formula:

$R_mSi[OR^1]_n$ wherein R is an organic group bonded to M through a carbon atom, R1 is H or an organic group, m+n equals 4.

17. A process for applying a solid coating onto a surface of an article, said surface of an article having a first physical property measurable as a degree of hydrophobicity and/or hydrophilicity, applying a liquid coating of an oxidizable material containing at least one element other than carbon, hydrogen, oxygen and nitrogen onto the surface of said article, oxidizing said oxidizable material by heating at a temperature of from 250° C. to 600° C. so as to directly bond said at least one element other than carbon, oxygen, nitrogen and hydrogen to said surface and form an oxidation residue on said surface, and thereby changing said first physical property with respect to its hydrophobicity and/or hydrophilicity.

18. The process of claim 17 wherein said oxidizable material comprises a material of the formula:

$R_mM[OR^1]_n$ wherein R is an organic group bonded to M through a carbon atom,

R1 is H or an organic group,

M is selected from the group consisting of Ti, Zn, Al, Sn, Fe, Cu, Zr, B, Mg, Mn, W, Sb, Au, Ag, and Cr, n is at least 1, and m+n equals the valence state of M.

19. The process of claim 17 wherein said oxidizable material comprises a material of the formula:

$R_mSi[OR^1]_n$ wherein R is an organic group bonded to M through a carbon atom, $R^1$ is H or an organic group, m+n equals 4.

20. The process of claim 17 wherein said oxidizable material comprises a silane or a metal ester represented by the formula:

$R_mM[OR^1]_n$ wherein M is an element selected from the group consisting of Si, Ti, Zn, Al, Sn, Fe, Cu, Zr, B, Mg, Mn, W, Sb, Ge, Au, Ag, and Cr, wherein R is an organic group, halogen or hydrogen, $R^1$ is H, or an organic group, m plus n equals the valence state of M, and n is at least 1.

21. The process of claim 19 wherein said oxidizable material comprises a silane or a metal ester represented by the formula:

$R_m M[OR^1]_n$ wherein M is an element selected from the group consisting of Si, Ti, Zn, Al, Sn, Fe, Cu, Zr, B, Mg, Mn, W, Sb, Ge, Au, Ag, and Cr, wherein R is an organic group, halogen or hydrogen, $R^1$ is H, or an organic group, m plus n equals the valence state of M, and n is at least 1.

22. The process of claim 21 wherein R is an aliphatic organic group.

23. The process of claim 21 wherein $R^1$ is an aliphatic or aromatic group and R is an aliphatic organic group.

24. The process of claim 1 wherein changing said first physical property with respect to its hydrophobicity and/or hydrophilicity is an increase in hydrophilicity, and heating is performed at a temperature of from 250° C. to 600° C.

25. The process of claim 4 wherein changing said first physical property with respect to its hydrophobicity and/or hydrophilicity is an increase in hydrophilicity.

26. The process of claim 10 wherein changing said first physical property with respect to its hydrophobicity and/or hydrophilicity is an increase in hydrophilicity.

27. The process of claim 11 wherein changing said first physical property with respect to its hydrophobicity and/or hydrophilicity is an increase in hydrophilicity, and heating is performed at a temperature of 250° C. to 600° C.

28. The process of claim 12 wherein changing said first physical property with respect to its hydrophobicity and/or hydrophilicity is an increase in hydrophilicity, and heating is performed at a temperature of 250° C. to 600° C.

29. The process of claim 13 wherein changing said first physical property with respect to its hydrophobicity and/or hydrophilicity is an increase in hydrophilicity, and heating is performed at a temperature of 250° C. to 600° C.

30. The process of claim 15 wherein changing said first physical property with respect to its hydrophobicity and/or hydrophilicity is increasing hydrophilicity.

31. The process of claim 16 wherein changing said first physical property with respect to its hydrophobicity and/or hydrophilicity is increasing hydrophilicity.

* * * * *